Patented Mar. 19, 1929.

1,705,699

UNITED STATES PATENT OFFICE.

HENRY A. AARONSON, OF NEW YORK, N. Y.

METHOD FOR PREPARING PENTAERYTHRITETETRANITRATE.

No Drawing.    Application filed November 8, 1923.    Serial No. 673,442.

(GRANTED UNDER THE ACT OF MARCH 3, 1883, AS AMENDED APRIL 30, 1928; 370 O. G. 757.)

The invention described herein may be manufactured and used by or for the Government for governmental purposes without the payment to me of any royalty thereon.

The present invention relates to a method for preparing pentaerythritetetranitrate.

Pentaerythritetetranitrate has many qualities which indicate its suitability for use as an explosive compound. It is stable, nonhygroscopic, easily ignited, and burns quietly without leaving an appreciable residue. The difficulty of its preparation has heretofore, however, prevented a more extensive use of this material as a military explosive.

The primary object of my invention is the establishment of a process whereby pentaerythritetetranitrate may be prepared in a short time with but little waste of the starting materials.

With the foregoing and other objects in view, my invention resides in the novel combination of ingredients and in the methods of preparation hereinafter described and claimed, it being understood that changes in the precise embodiment of the invention herein disclosed may be made within the scope of what is claimed without departing from the spirit of the invention.

In carrying out the process which forms the subject of this invention, pentaerythrite of known purity will be added slowly and in small quantities with efficient stirring to a suitable quantity of nitric acid as the first step. In practice, it has been found desirable to use about six times, by weight, as much nitric acid as pentaerythrite and the nitric acid will be, preferably, very strong, at least 90%. During the addition of the pentaerythrite to the nitric acid, the temperature will be maintained at about 15° C.

After all the pentaerythrite has been added, the stirring will be continued for a suitable period, in practice, about fifteen minutes. As pentaerythritetetranitrate is heavier than the spent nitric acid, after the mixture has been allowed to stand awhile the spent acid may be removed from the solution by drawing it off or by a centrifuge.

The remaining material after the removal of the spent acid will be a somewhat impure quantity of pentaerythritetetranitrate. This pentaerythritetetranitrate, is, preferably, washed thoroughly with water to remove any surface acidity and then boiled with a soda ash or other alkaline solution to remove most of the occluded acidity. After filtration, the pentaerythritetetranitrate is dried and is, preferably, recrystallized from acetone or a similar solvent.

The pentaerythrite which is used as the starting material in this process for the production of pentaerythritetetranitrate may be prepared in any suitable manner. I have found it preferable in practice, however, to manufacture the pentaerythrite according to the method described in my copending application Ser. No. 673,441 filed Nov. 8, 1923. According to this method acetaldehyde and formaldehyde are first mixed with a suitable amount of water in the proportions of about one molecule of acetaldehyde to five molecules of formaldehyde, the whole is then stirred thoroughly, treated with lime to raise the temperature of the solution to an appropriate point and thoroughly mixed for a suitable period, the lime is removed by precipitation with an appropriate substance or substances, in practice, sulphuric acid and oxalic acid and the resultant solution evaporated under vacuum and washed with alcohol. With pentaerythrite prepared by this process, it has been found, that a yield of approximately three grams of pure pentaerythritetetranitrate may be obtained for each gram of acetaldehyde used. The ratio of production, is therefore, greatly increased over methods heretofore used in preparing pentaerythrite and pentaerythritetetranitrate.

By employing strong nitric acid alone a maximum yield may be obtained and the spent acid may be more readily recovered or removed from the mixture than by any method heretofore devised.

Having thus described my invention, what I claim is:

1. The method of preparing pentaerythritetetranitrate which includes adding pentaerythrite to concentrated nitric acid, while stirring, and continuing the stirring after all the pentaerythrite has been added for approximately fifteen minutes, allowing the mixture to settle, removing the spent acid, maintaining a temperature of about 15° C., removing the acidity and then drying and recrystallizing after treatment with a solvent.

2. The method of preparing pentaerythrite-tetranitrate which includes adding pentaerythrite to concentrated nitric acid, and maintaining a temperature of about 15° C., separating the resultant spent acid and pentaerythrite-tetranitrate, and then removing the acidity from the pentaerythrite-tetranitrate.

HENRY A. AARONSON.